Figure 1:
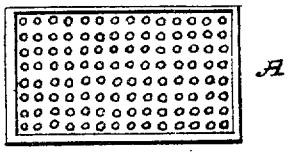
Figure 2:
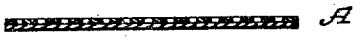
Figure 3:
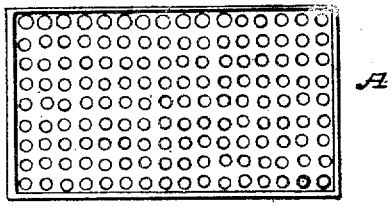

J. HASKINS.

Rubber Fabric.

No. 3,100.

Reissued Aug. 25, 1868.

WITNESSES:

W. B. Stockbridge

A. W. Mabry

INVENTOR

John Haskins per

Alexander P. Mason

Atty

United States Patent Office.

JOHN HASKINS, OF BOSTON, MASSACHUSETTS.

*Letters Patent No.* 67,298, *dated July* 30, 1867; *reissue No.* 3,100, *dated August* 25, 1868.

IMPROVED RUBBER FABRIC.

The Schedule referred to in these Letters Patent and making part of the same.

TO ALL WHOM IT MAY CONCERN:

Be it known that I, JOHN HASKINS, of Boston, in the county of Suffolk, and State of Massachusetts, have invented certain new and useful Improvements in Perforated Sheet Rubber, Rubber, and Cloth; and I do hereby declare that the following is a full, clear, and exact description thereof, reference being had to the annexed drawings, and to the letters of reference marked thereon.

A A represent pieces of India-rubber sheets, which are provided with a great many small perforations at regular intervals apart. These perforations will be made more or less minute, according to the nature of the use to which the sheets will be put, and the sheets will be more or less thick, according to the use for which they may be designed.

I propose using India-rubber sheets of any desired thickness, which shall be provided with perforations of suitable size, as an outer cover or coating for silk, cotton, woollen, or other cloth, or any other material which will answer the purpose of any article of wearing-apparel. I may cover a great variety of fabrics with this coating of perforated rubber, and I can use such fabrics for almost every article of ladies' or gentlemen's clothing. Shoes and boots can be made of this material, and the insensible perspiration will be readily carried off. The perforations in the rubber may be very small, so that it may be necessary to hold the article up to a strong light to distinguish them, or they may be much larger. Boots or shoes made of cloth covered with rubber of this character can be made to fit the foot much neater, while they will be more durable and easy upon the foot.

I do not propose to confine myself to any particular class of articles for which this may be used.

Having thus fully described my invention, what I claim as new, and desire to secure by Letters Patent, is—

The within-described article of perforated rubber as an article of manufacture, the same being used as and for the purpose set forth.

In testimony that I claim the foregoing, I have hereunto set my hand and seal, this 11th day of July, 1868.

JOHN HASKINS. [L. S.]

Witnesses:

THOMAS LEWIS,

CARROLL D. WRIGHT.